(12) United States Patent
Aerrabotu et al.

(10) Patent No.: US 7,426,382 B2
(45) Date of Patent: Sep. 16, 2008

(54) CONTACT VALIDATION AND TRUSTED CONTACT UPDATING IN MOBILE WIRELESS COMMUNICATIONS DEVICES

(75) Inventors: Naveen Aerrabotu, Gurnee, IL (US); Phieu Tran, Lincolnwood, IL (US); Jerome Vogedes, Wind Lake, WI (US)

(73) Assignee: Motorola, Inc., Schaumburg, IL (US)

( * ) Notice: Subject to any disclaimer, the term of this patent is extended or adjusted under 35 U.S.C. 154(b) by 1295 days.

(21) Appl. No.: 10/267,390

(22) Filed: Oct. 9, 2002

(65) Prior Publication Data

US 2004/0203598 A1 Oct. 14, 2004

(51) Int. Cl.
*H04M 1/66* (2006.01)
*H04M 1/68* (2006.01)
*H04M 3/16* (2006.01)

(52) U.S. Cl. .............. 455/411; 455/412.1; 455/414.1; 455/418; 455/556.2; 380/283; 705/64; 705/67; 713/151; 713/156; 713/166; 713/176

(58) Field of Classification Search .............. 455/412.1, 455/414.1, 418, 550.1, 556.2, 411; 380/283; 705/64, 67; 713/151, 156, 166, 176, 201
See application file for complete search history.

(56) References Cited

U.S. PATENT DOCUMENTS

| 5,872,849 A * | 2/1999 | Sudia ..................... 713/175 |
|---|---|---|
| 5,943,423 A * | 8/1999 | Muftic ..................... 705/67 |
| 5,943,425 A | 8/1999 | Mizikovsky |
| 5,943,615 A | 8/1999 | Rose et al. |
| 6,047,070 A | 4/2000 | Raaf |
| 6,141,544 A | 10/2000 | Corriveau et al. |
| 6,192,131 B1 * | 2/2001 | Geer et al. .................. 380/283 |
| 6,415,144 B1 | 7/2002 | Findikli et al. |
| 6,754,829 B1 * | 6/2004 | Butt et al. ................... 713/200 |
| 6,772,331 B1 * | 8/2004 | Hind et al. ................... 713/151 |
| 2002/0067832 A1 * | 6/2002 | Jablon ......................... 380/277 |
| 2002/0077993 A1 * | 6/2002 | Immonen et al. .............. 705/77 |
| 2002/0102964 A1 | 8/2002 | Park |
| 2002/0142763 A1 * | 10/2002 | Kolsky ........................ 455/419 |
| 2003/0014629 A1 * | 1/2003 | Zuccherato .................. 713/156 |

(Continued)

FOREIGN PATENT DOCUMENTS

JP    2000036809    2/2000

(Continued)

OTHER PUBLICATIONS

AePona Corporation, "SyncML device management", 1999, pp. 1-9.*

(Continued)

*Primary Examiner*—Stephen M D'Agosta
(74) *Attorney, Agent, or Firm*—Roland K. Bowler, II

(57) ABSTRACT

A method in a wireless communication device including receiving contact information with a signature from a source (310) not on a trusted contact list, validating (362) the signature by comparing the signature to an reference signature stored on the method in a wireless communication device, and updating (368) the trusted contact list regarding the contact information received if the signature is valid. In some applications, the contact information and signature is associated with a wireless communication device provisioning session request message.

17 Claims, 3 Drawing Sheets

U.S. PATENT DOCUMENTS

2003/0037237 A1* 2/2003 Abgrall et al. .............. 713/166
2003/0056114 A1* 3/2003 Goland ...................... 713/201

FOREIGN PATENT DOCUMENTS

JP    2001215873    8/2001
JP    2002189976    7/2002

OTHER PUBLICATIONS

"Internet Over-the-Air Handset Configuration Management (IOTA)", 3rd Generation Partnership Project 2 "3GPP2", Version 1.0, Jul. 11, 2002, 14 pages.

"Open Mobile Alliance OMA-RD_PushSecurity-V1_0-20030619-D", WAP Push Security Requirements Draft Version 1.0—Jun. 19, 2003, 18 pages.

* cited by examiner

CONTACT VALIDATION AND TRUSTED CONTACT UPDATING IN MOBILE WIRELESS COMMUNICATIONS DEVICES

FIELD OF THE DISCLOSURE

The present disclosure relates generally to mobile wireless communications, and more particularly to validating communications from unknown contacts, updating trusted contact lists stored on mobile wireless communications devices, related session request messages, and methods therefor.

BACKGROUND OF THE DISCLOSURE

Internet Protocol Over The Air (IOTA), Wireless Application Protocol (WAP) provisioning, and PUSH specifications are wireless communication protocols that enable network operators to program and push content to cellular telephone handsets over the air using a WAP enabled browser. The IOTA provisioning protocol has been implemented by Code Division Multiple Access (CDMA) wireless network operators, and the WAP provisioning protocol has been implemented by Global System for Mobile Communications (GSM) communication network operators.

To initiate a WAP provisioning session, a Push Proxy Gateway (PPG) sends an Internet Protocol (IP) message, known as a Session Initiation Request (SIR) or a Hello Request, to the mobile station. An IOTA provisioning session is initiated similarly by sending a session request in the form of a modified Short Message Service (SMS) message, known as a bootstrap request, from an SMS Center (SMSC) to the mobile station.

In IOTA provisioning sessions, the SMS or bootstrap request contains information enabling the phone browser to fetch Mobile Management Command (MMC) documents from a specified address. MMC documents manage specific parameters in the mobile handset, for example, by instructing the handset to read and write phone parameters, to initiate A-key exchange, and to update a preferred roaming list (PRL), etc.

Bootstrap request messages are relatively easy to generate and/or modify. If a phone number and its ESN are known, an unauthorized bootstrap message may be generated and sent to the phone with deceitful instructions to fetch a counterfeit MMC document, which may be used to manipulate the phone, for example by instructing it to perform some action that would provide unauthorized service to a hacker.

It has been proposed to protect against spoofing and other unauthorized communications by comparing source addresses from which session initiation requests originate with a list of known valid or trusted contacts stored on the wireless handset. Under the proposal, however, the list of trusted contacts stored in the wireless handset is static and does not provide for ready address changes and/or the removal and addition of new trusted contacts.

The various aspects, features and advantages of the present disclosure will become more fully apparent to those having ordinary skill in the art upon careful consideration of the following Detailed Description thereof with the accompanying drawings described below.

DETAILED DESCRIPTION

Figure 1:
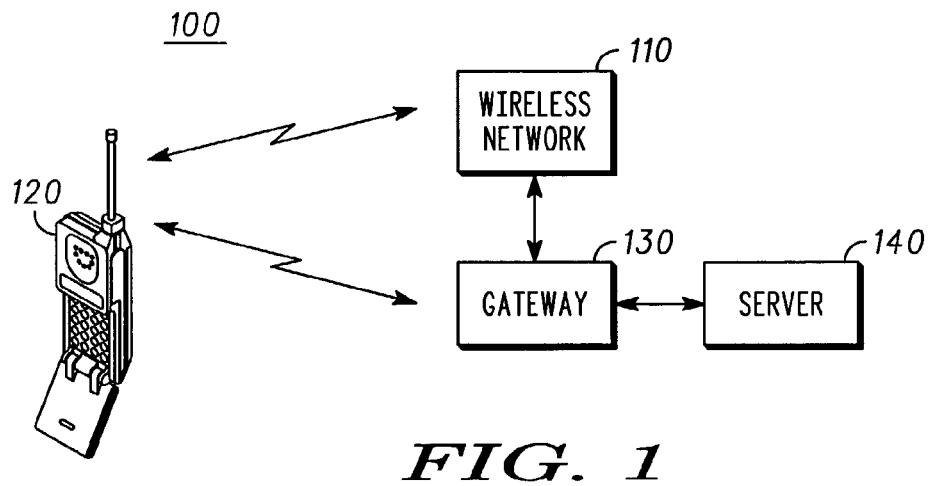
FIG. 1 is a communications system according to an exemplary implementation.

FIG. 1 illustrates a communications system 100 comprising generally a wireless network 110, for example, a CDMA or GSM/GPRS cellular network or some other wireless network infrastructure, for providing communication services to wireless communications devices.

Figure 2:
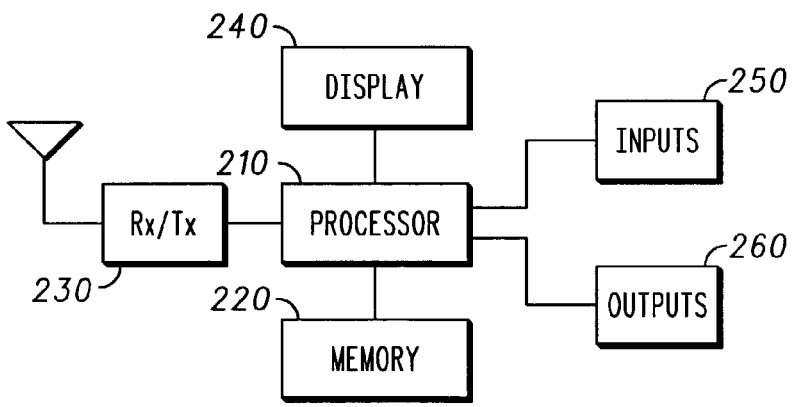
FIG. 2 is a process flow diagram for an exemplary implementation.

The wireless communication device may be a mobile wireless handset 120, for example, a CDMA or GSM/GPRS or some other mobile communications device. FIG. 2 is an exemplary wireless communication device 200 comprising generally a processor 210 coupled to memory 220, for example, RAM and ROM, and in some embodiments a SIM, USIM, R-UIM, NVM, etc. The processor is also coupled to a radio transceiver 230 and to a display device 240. The processor is also coupled to input 250, for example, a microphone and data ports, and to outputs 260, for example, a speaker and data ports.

In FIG. 1, the wireless communications network 110 is coupled to a gateway 130, which is coupled to a server 140. In Internet Over the Air (IOTA) provisioning applications, now required by many CDMA wireless network operators providing voice and data services, the server 140 is an IOTA provisioning server, and the gateway 130 is a provisioning gateway, for example, a Wireless Application Protocol (WAP) provisioning gateway. In the exemplary embodiment, the wireless network 110 includes a Short Message Service Center (SMSC). In WAP and other provisioning applications, the server and gateway may be identified differently, but these and the other exemplary designations are not intended to limit the invention.

A wireless communications device session request is initiated generally from a server, although the origination point for the session request may be from some other source communicating with the server. Particularly, in the process-flow diagram 300 of FIG. 3, at block 310, a Push Proxy Gateway (PPG) sends a SIR or Hello Request to the client. In other embodiments, more generally, the session request may originate from some other server. The session request may also be in a format other than an SIR, for example, a bootstrap request.

Figure 3:
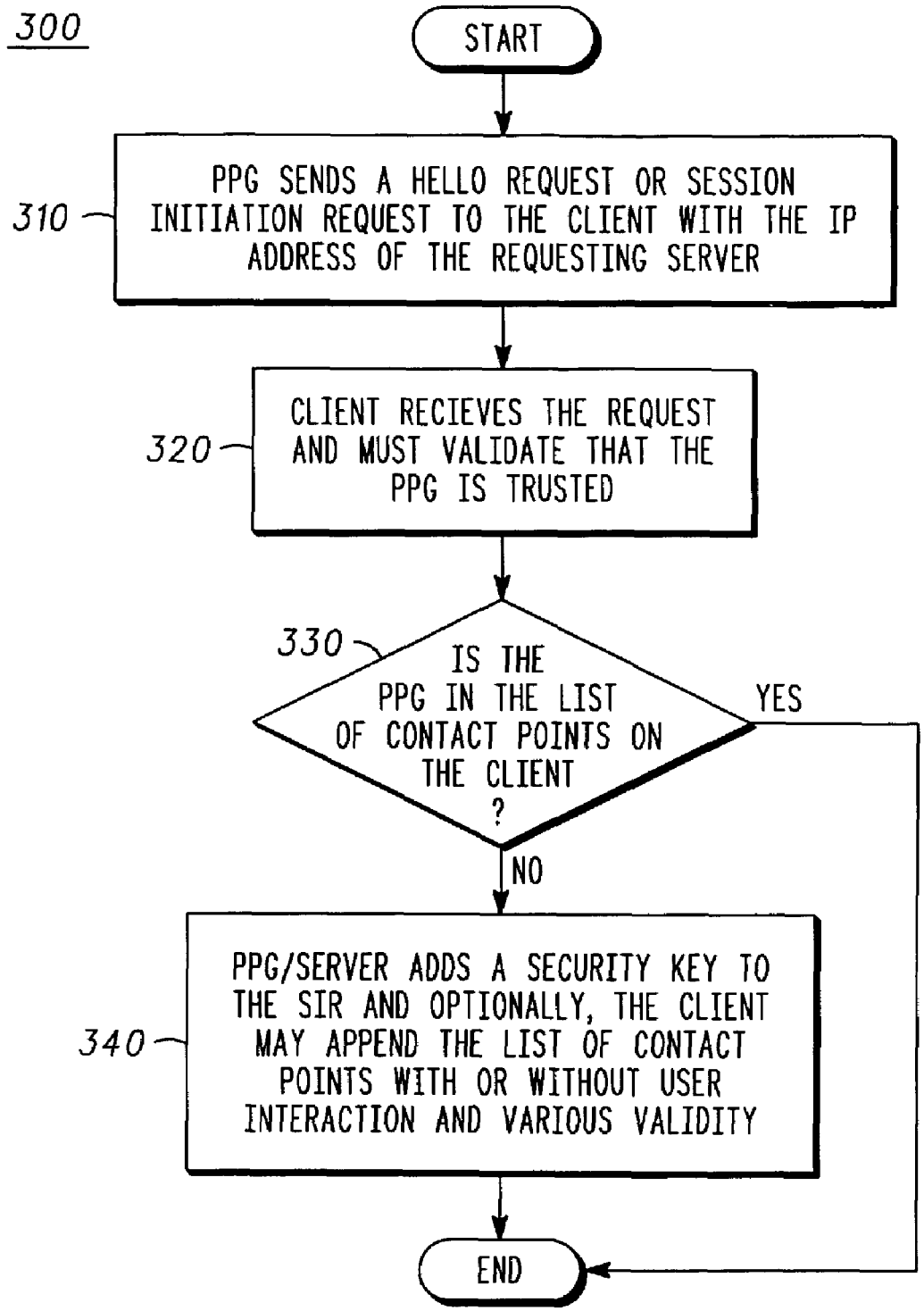
FIG. 3 is an exemplary communications diagram for several implementations.

In FIG. 3, at block 310, the session request generally includes information about the source of the requester, for example, its IP address or some other information that may be used to validate the trustworthiness of the sender or the origin of the session request.

In the exemplary application, the session request is a wireless communication device provisioning session request, for example, a bootstrap request or a Session Initiation Request (SIR) or some other provisioning session request. In other applications, more generally, the session request may be a request for a session other than a wireless device provisioning session.

In FIG. 1, the session request is typically communicated from the server 140 to a gateway and then to the communications network, which communicates or pushes the session request to the mobile handset. In the exemplary IOTA provisioning application, illustrated in FIG. 4, the IOTA/PUSH provisioning server 410 creates a bootstrap request message 402 and sends it to a WAP provisioning or push gateway 420, which forwards the bootstrap message to the wireless communications network 430, for example, to an SMSC thereof. The wireless communications network sends the message to the mobile handset 440. The communication of the request from the server to the mobile station is identified at communication thread 450.

In FIG. 3, at block 320, the client or handset receives the session request, which must be validated. In some embodiments, at block 330, the session request is validated by comparison thereof with a list of trusted contact sources stored on the mobile station or handset, for example, by comparing the IP address of the server with a list of valid addresses.

The list of trusted sources may be obtained by the mobile station from the network and updated periodically. The list of trusted sources is stored in memory on the mobile station, for example, in a SIM, USIM, R-UIM, NVM, etc.

In other applications, validation of the session request may be performed at the network rather than at the mobile handset. For example, the mobile handset may transmit the session request message or relevant portion thereof, for example, the IP address, to the network for validation. The mobile handset and network are generally capable of conducting secured communications, discussed further below, which would ensure the integrity of validation transactions performed at or by the network.

Figure 4:
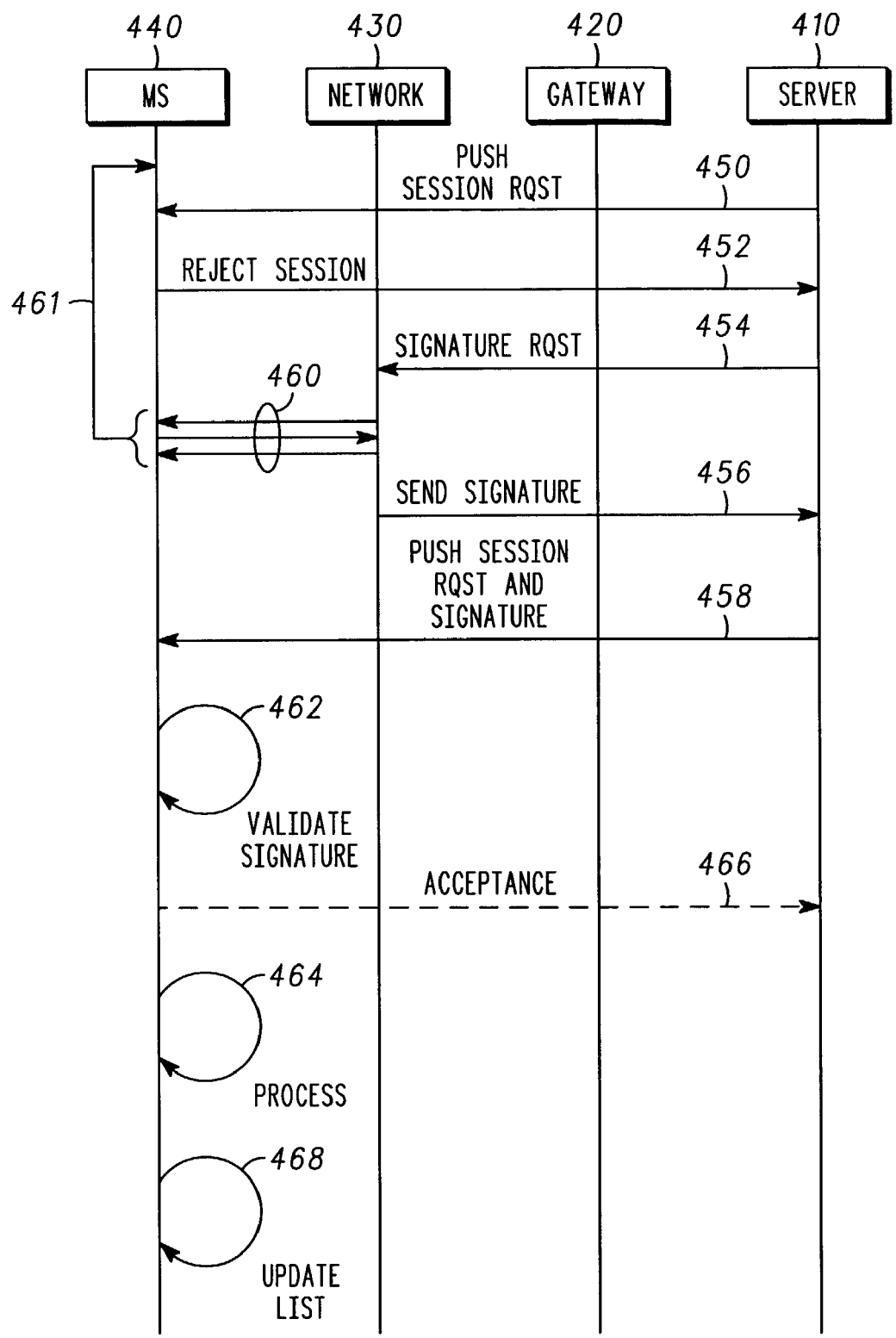
FIG. 4 is an exemplary wireless communication device provisioning session request message.

In FIG. 4, if the source of the session request is not on the list of trusted contacts, in some applications the mobile station may reject the request, as indicated at communication 452. The rejection of the session request is preferably a default response where the origin of the session request not validated. Validation may be performed, for example, by the mobile station or by the network.

In FIG. 4, at signature request 454, the server sending a provisioning session request to the client requests a signature from the wireless communications network or from some other authorizing source recognized by the wireless device. At communication 456, the network transmits the signature to the server in response to the request 454.

The signature is generally authenticating information received by the server from the network for presentation to the wireless device for the purpose of authenticating the trustworthiness of the server as a source of information for at least the transaction or session with which the signature is associated. In one embodiment, the signature is valid for only the session with which is it associated. More generally the signature may be valid for a certain specified time period. For example, it may have an expiration period or time stamp associated therewith.

In FIG. 4, in some applications, the server 410 requests the signature from the network 430 after first sending a session request without the signature and upon receiving a session rejection from the mobile station 440, for example, for lack of trustworthiness upon comparison of the session request to a list of trustworthy contact points or sources. In other applications, the server 410 requests the signature from the network 430 before or without first sending the session request message without authenticating signature data. Thus in some applications, steps 450 and 452 of FIG. 4 are unnecessary and may be omitted by first requesting a signature from the network or other authorizing source.

The signature is generally combined with the session request message, for example, in a header thereof, by the server and thus transmitted with the session request. In FIG. 4, upon receiving the authenticating signature from the network 430 or other source, in response to the signature request 454, the signature is combined with the session request message, for example, by placing it in the message header or by otherwise combining the signature and message, the particulars of which are not intended to limit the invention. The combining step may be performed at the server or at some other location. In FIG. 3, the signature, which may also be considered a security key, is added to the message at block 340.

Figure 5:
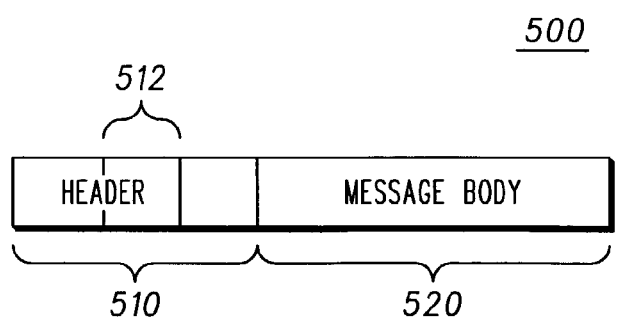
FIG. 5 illustrates a wireless communication device provisioning session request message.

FIG. 5 is an exemplary wireless communication device provisioning session request message comprising generally a message header portion 510 and a message body portion 520. In one embodiment, the message header message portion includes a signature data field for receiving authenticating signature data from a network service provider that may be used to validate the trustworthiness of the session request source. In other embodiments, however, the authorizing signature may be combined with the message by means other than placement in a header data field. For example, it may be appended or otherwise concatenated with the session request.

In the exemplary embodiment of FIG. 5, the message header includes a signature data field 512 for storing authorizing signature data received from the network. As noted, in one embodiment, the session request message is a Wireless Application Protocol Session Initiation Request, and in another embodiment it is an Internet Over the Air (IOTA) bootstrap request.

In FIG. 4, the signature must also be provided to the mobile station 440 by the network 430, so that the mobile station can validate the signature received from the server 410. In FIG. 4, the signature is communicated from the network 430 to the mobile station 440 in a series of related communications therebetween, which are identified by the group of communication threads 460.

In one embodiment, the network initiates a Shared Secret Data (SSD) update procedure followed by a Unique Challenge Response (UCR) procedure. As a result of these known communication procedures, both the network and the phone are capable of independently generating identical data, values, signature, or keys, etc. The network may also generate an SSD through any of the known Hash algorithms or techniques. In alternative embodiments, other procedures may be used for communicating secured information between the network and mobile station.

In FIG. 4, in some applications, the signature is transmitted to the mobile station 440 only after the server 410 makes the signature request 454. More generally, however, the signature may be communicated to the mobile station 440 any time before the signature request 454 by the server as indicated in FIG. 4 by arrow 461.

The signature communicated to the mobile station is effective at least for validating the session request from the server. More generally, however, the signature may be effective for a more extended time period, for example, by associating therewith a time stamp upon the expiration of which a new or updated signature must be acquired. The mobile station may thus store the signature from the network for later use.

In FIG. 4, upon receiving the signature from the network or other authorizing source and combining it with a session request, the server 410 transmits, or re-transmits, the session request and signature to the mobile station 440, as indicated in communication thread 458.

In FIG. 4, at validation process 462, the mobile station validates the signature associated with the session request 458, communicated by comparing it to a signature received directly from the network or authorizing source, also referred to herein as the reference signature.

In FIG. 4, at process 464, if the signature is valid, the session request is processed at the mobile station 440, for example, the mobile station may subsequently fetch an MMC document or push content. In some applications, upon validating the signature, the mobile station first communicates acceptance to the server 410, at acceptance communication 466, before processing the session request.

In FIG. 4, the list of trusted contacts may be updated, at 468, relative to the requester of the signature session if the signature of the signature session is valid. In some applications, the trusted contact list is updated with contact information received with the session request if the signature is valid. For example, the requester of the session may be added to the list of trusted contacts stored on the wireless communication device. In FIG. 3, at block 340, a contact point is appended to a user list.

In other embodiments, the contacts or entries of the trusted contacts list have an expiration period associated therewith. Upon expiration of the time period, the trustworthiness of the contact may be re-established by submission or re-submission of an authorizing signature to the mobile station from the network. In these cases, the contact list clock is reset for a particular contact on the list upon receipt of the authorizing signature, without the need for adding a new contact to the list. In other embodiments, contacts may be removed from the list or otherwise unauthorized.

Upon updating the contact list stored at either the mobile station or the network or both, it is unnecessary for the server or sender of the session request to subsequently obtain a signature from the network or authorizing source. Dynamically updating a trusted contact list stored on the mobile device also enables the device to roam freely without being dependent on a single source for trusted contact list updates.

While the present inventions and what are considered presently to be the best modes thereof have been described in a manner that establishes possession thereof by the inventors and enabling of those having ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communication device, comprising:
   receiving a session request;
   rejecting the session request;
   receiving a signature session request having a signature after the rejecting the session request;
   validating the signature of the signature session request.

2. The method of claim 1, validating the signature of the signature session request by comparing the signature thereof to information stored on the wireless communication device.

3. The method of claim 1, generating a reference signature on the wireless communication device from information received from a trusted source, validating the signature of the signature session request by comparing the signature of the signature session request to the reference signature generated on the wireless communication device.

4. The method of claim 3, generating the reference signature before receiving and rejecting the session request.

5. The method of claim 3, generating the reference signature after rejecting the session request.

6. The method of claim 1, rejecting the session request if a requestor of the session is not on a list of trusted contacts stored on the wireless communication device.

7. The method of claim 1, rejecting the session request if a requestor of the session is not on a list of trusted contacts.

8. The method of claim 7, validating the signature of the signature session request by comparing it to a reference signature stored on the wireless communication device.

9. The method of claim 6, adding the requestor of the session to the list of trusted contacts stored on the wireless communication device if the signature of the session is valid.

10. The method of claim 1, updating a list of trusted contacts relative to a requestor of the signature session if the signature of the signature session is valid.

11. The method of claim 1, validating the signature by determining whether a requester of the session is on a list of trusted contacts stored on the wireless communication device.

12. A method in a wireless communication device, comprising:
    storing a reference signature from a trusted source on the wireless communication device;
    receiving a message having an authenticating signature;
    validating the authenticating signature of the message by comparing the authenticating signature of the message to the reference signature on the wireless communication device;
    adding a sender of the message to a list of trusted contacts if the authenticating signature is valid;
    generating a new reference signature on the wireless communication device from information received from a trusted source upon expiration of a previously stored reference signature.

13. The method of claim 12, generating the reference signature on the wireless communication device from information received from a trusted source before receiving the message.

14. A method in a wireless communication device, comprising:
    receiving contact information with a signature from a source not on a trusted contact list;
    validating the signature on the wireless communication device;
    updating the trusted contact list regarding the contact information received if the signature is valid.

15. The method of claim 14, generating the reference signature on the wireless communication device from information received from a trusted source.

16. The method of claim 14, determining whether the contact information with the signature is from a trusted source by determining whether the contact information is on a trusted contact list stored on the wireless communication device.

17. A method in a server communicating with a wireless communications network, the method comprising:
    requesting a signature from the wireless communications network;
    sending a session request including an authenticating signature to a mobile wireless communication device in the wireless communications network;
    receiving information from the wireless communications network in response to the request for a signature, generating the session request including the authenticating signature based upon the information received from the wireless communications network.

* * * * *